UNITED STATES PATENT OFFICE.

THOMAS J. LYNCH, OF NEW YORK, N. Y., ASSIGNOR OF ONE-HALF TO HIMSELF AND ONE-HALF TO HENRY S. LIVINGSTON, OF NEW YORK, N. Y.

DANDRUFF REMEDY.

1,039,064. Specification of Letters Patent. Patented Sept. 17, 1912.

No Drawing. Application filed May 10, 1910. Serial No. 560,400.

*To all whom it may concern:*

Be it known that I, THOMAS J. LYNCH, a citizen of the United States, residing at New York city, county and State of New York, (post-office address, 170 William street, New York city, State of New York,) have invented a new and useful Dandruff Remedy, of which the following is a clear and exact description.

The present invention consists in the employment of those bacilli, or their products, when grown in a suitable culture medium, in the production of health lotions for the treatment of the scalp, which are characterized by an antagonism to disease producing organisms.

The fact has been established that the growth of disease producing organisms is retarded in the presence of certain bacilli, especially lactic acid bacilli, or of the products of these bacilli when grown in a suitable culture medium. Of these lactic acid bacilli I have found that the *Bacillus Bulgaricus* serves my purposes best.

In the manufacture of my health lotions for the treatment and disinfection of the scalp I first prepare a base containing the bacilli or their products in liquid form. This base may consist either of the pure cultures in a suitable medium or of the filtrate of these cultures containing only the products of the bacilli.

In carrying out my process I proceed as follows: Any known lotion or combination of ingredients suitable for application to the scalp and containing no substance antagonistic to the bacilli above described or having any detrimental chemical action on the products of these bacilli, is carefully and intimately mixed in suitable quantity with my liquid cultures or of the products of these bacilli in liquid form and the operation carried out at temperatures below 50° C.

*Manufacture of a dandruff remedy.*

Example 1: The bacilli are grown in an incubator on sterile Cohendy or other suitable broth at a temperature of 39° C. for a period of twenty-four hours. The product is then filtered through Berkefeld filters, the filtrate (free from the organisms) being retained. To the filtrate is added alcohol, 25%, or quinin, 1%, or both of these or any other suitable preservative. A suitable perfume is then added.

Example 2: The organisms are planted on Cohendy or other suitable broth and grown as in "Number 1" in an incubator for a period of twenty-four hours, at a temperature of 39° C. This product is not filtered and the only addition to it is a suitable perfume.

The new lotion thus obtained possesses very valuable properties. It will keep the scalp free from disease producing organisms, prevent the growth of dandruff and keep the scalp in a clean and healthy condition.

Although I have above described examples by which the above-described preparations may be obtained, nevertheless I do not wish to be understood as thereby excluding equivalents for the ingredients or the operations employed in the process. It is possible that substitutes may be employed without departing from the scope of the invention intended to be secured thereby.

Having now described my invention, what I claim as new and desire to secure by Letters Patent, is:

1. A hair tonic consisting of lactic acid bacilli substances of a culture of lactic acid bacilli and substantially free from the lactic acid bacilli themselves together with other hair tonic ingredients having no detrimental action on said lactic acid bacilli substances.

2. A hair tonic comprising the filtrate from a culture of lactic acid bacilli, and being substantially free from lactic acid bacilli.

In testimony whereof I have hereunto set my hand in the presence of two subscribing witnesses.

THOMAS J. LYNCH.

Witnesses:
ANTHONY GREF,
ALVIN V. HUPFER.